US006957667B2

(12) United States Patent
Huang (10) Patent No.: US 6,957,667 B2
(45) Date of Patent: Oct. 25, 2005

(54) MULTIFUNCTION TUBE JOINT

(76) Inventor: Chun Po Huang, No. 41, Lane 120, Wenshinnan 3rd Rd., Nantuen Chiu, Taichung 408 (TW)

( * ) Notice: Subject to any disclaimer, the term of this patent is extended or adjusted under 35 U.S.C. 154(b) by 207 days.

(21) Appl. No.: 10/671,662

(22) Filed: Sep. 29, 2003

(65) Prior Publication Data
US 2005/0067032 A1 Mar. 31, 2005

(51) Int. Cl.[7] ............................................. F16K 11/20
(52) U.S. Cl. ...................................... 137/881; 137/887
(58) Field of Search ................................ 137/881, 887

(56) References Cited

U.S. PATENT DOCUMENTS

| | | | | |
|---|---|---|---|---|
| 2,869,573 A | * | 1/1959 | Stafford | 137/223 |
| 3,707,994 A | * | 1/1973 | Brown | 137/637.4 |
| 4,078,728 A | * | 3/1978 | Nordeen | 239/586 |
| 4,616,677 A | * | 10/1986 | Krechel et al. | 137/881 |
| 4,848,398 A | * | 7/1989 | Leach | 137/556.3 |

* cited by examiner

Primary Examiner—John Fox
(74) Attorney, Agent, or Firm—Rosenberg, Klein & Lee (57) ABSTRACT

A tube joint that can be used as a volume control valve, air sprayer or/and a T-tube. The multifunction tube joint mainly contains: an elongated body, a revolving valve, a stem, a branch, a piston valve rod, a button and a spring. The elongated body contains: a main channel longitudinally therethrough, a protrusion thereon and a tunnel vertically therethrough. The protrusion has a receptacle therein communicated with the main channel. The revolving valve is rotably received through the tunnel. The revolving valve has a controlling channel vertically therethrough. The controlling channel is communicable to the main channel. The stem is connected to the receptacle. The stem has a stem channel therein, communicable with the main channel. The branch is connected to the stem. The branch has a branch channel therein communicated with the stem channel of the stem. The piston valve rod is slidably received in the stem channel of the stem with a first end extended out thereof. The button is mounted with the first end of the piston valve rod. The button is engagable with the stem. The spring is placed with one end against a bottom of the receptacle of the protrusion and with another end against a second end of the piston valve rod. The piston valve rod can be pressed against the spring to let the main channel to communicate with the branch channel through the stem channel and the piston valve rod can be released to block communication between the main channel and the branch channel.

15 Claims, 7 Drawing Sheets

MULTIFUNCTION TUBE JOINT

TECHNICAL FIELD

This invention relates generally to a tube joint, in particular, to provide a multifunction tube joint that can be used as a volume control valve, air sprayer or/and a T-tube.

BACKGROUND OF THE INVENTION

An air-powered tube system generally contains different tube joints for different purposes. For example, a volume control valve is to control air volume in a tube system. An air sprayer is to blow off debris and dusts to maintain a system. A T-tube is to dispense airflow in a tube system. Conventional tube joints have only one or two of these functions. Accordingly, to achieve all the functions, an air-powered tube system has to include many tube joints. However, more tube joints may cause more air leak. The working efficiency and power produced by an air power tube system may decrease caused by air leak. Many tube joints also occupy much space and make a system difficult to manage. Many tube joints also increase the weight of a powered tube system such as an air-powered tool. An over-weighted air-powered tool is inconvenient to for a user to use it.

One of the conventional arrangements of an air-powered tube system used in an air-powered tool is that a T-tube connected with an air power source with its input end and connected with the air-powered tool with a first output end and connected with a air sprayer with a second output end. Thereby, the airflow can communicate to both the air-powered tool and the air sprayer from the air power source. However, the air sprayer is not used frequently. It's used only when the debris produced by the air-powered machine need to be cleaned. Most of the time the air sprayer is placed on a working platform. The air supply to the air-powered machine may be influenced by the branch connection to the air sprayer because the airflow supplied from the air power source is divided to two portions. Besides, this arrangement contains many tubes. When a user uses the air-powered machine such as an air-powered polishing machine, the tube connected to the sprayer will disturb him. This situation may cause harm to the user for example the tubes trip him. Another arrangement is to replace an air-powered machine and an air sprayer once at a time with single tube. This will waste a lot of time in changing the two devices. Therefore a multifunction tube joint that can be used as a volume control valve, air sprayer or/and a T-tube is needed.

SUMMARY OF INVENTION

It is therefore an objective of the present invention to provide a tube joint that can be used as a volume control valve, air sprayer or/and a T-tube.

The present invention, briefly summarized, in one embodiment discloses a multifunction tube joint. The multifunction tube joint mainly contains: an elongated body, a revolving valve, a stem, a branch, a piston valve rod, a button and a spring. The elongated body contains: a main channel longitudinally therethrough, a protrusion thereon and a tunnel vertically therethrough. The protrusion has a receptacle therein communicated with the main channel. The revolving valve is rotably received through the tunnel. The revolving valve has a controlling channel vertically therethrough. The controlling channel is communicable to the main channel. The stem is connected to the receptacle. The stem has a stem channel therein, communicable with the main channel. The branch is connected to the stem. The branch has a branch channel therein communicated with the stem channel of the stem. The piston valve rod is slidably received in the stem channel of the stem with a first end extended out thereof. The button is mounted with the first end of the piston valve rod. The button is engagable with the stem. The spring is placed with one end against a bottom of the receptacle of the protrusion and with another end against a second end of the valve rod. The piston valve rod can be pressed against the spring to let the main channel to communicate with the branch channel through the stem channel and the piston valve rod can be released to block communication between the main channel and the branch channel.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

An illustrative embodiment of the multifunction tube joint according to the present invention will be explained below with reference to FIGS. 1 to 8. The multifunction tube joint contains an elongated body 1, a revolving valve 2, a stem 3, a branch 34, a piston valve rod 4, a button 5 and a spring 6. The elongated body 1 contains: a main channel 13 longitudinally therethrough, a protrusion 12 thereon and a tunnel 14 vertically therethrough. A first end 10 of the elongated body 1 has a threaded out periphery 100 for being engaged with a tube. A second end 11 of the elongated body 1 has a threaded inner periphery 110 for being engaged with another tube. The elongated body 1 contains a concave 16 parallelly located next to the tunnel 14. A compression spring 160 is received in the concave 16 and a positioning ball 161 is placed on top of the compression spring 160. The positioning ball 161 is to engage with the revolving valve 2 for controlling rotation thereof.

Figures 1, 2:
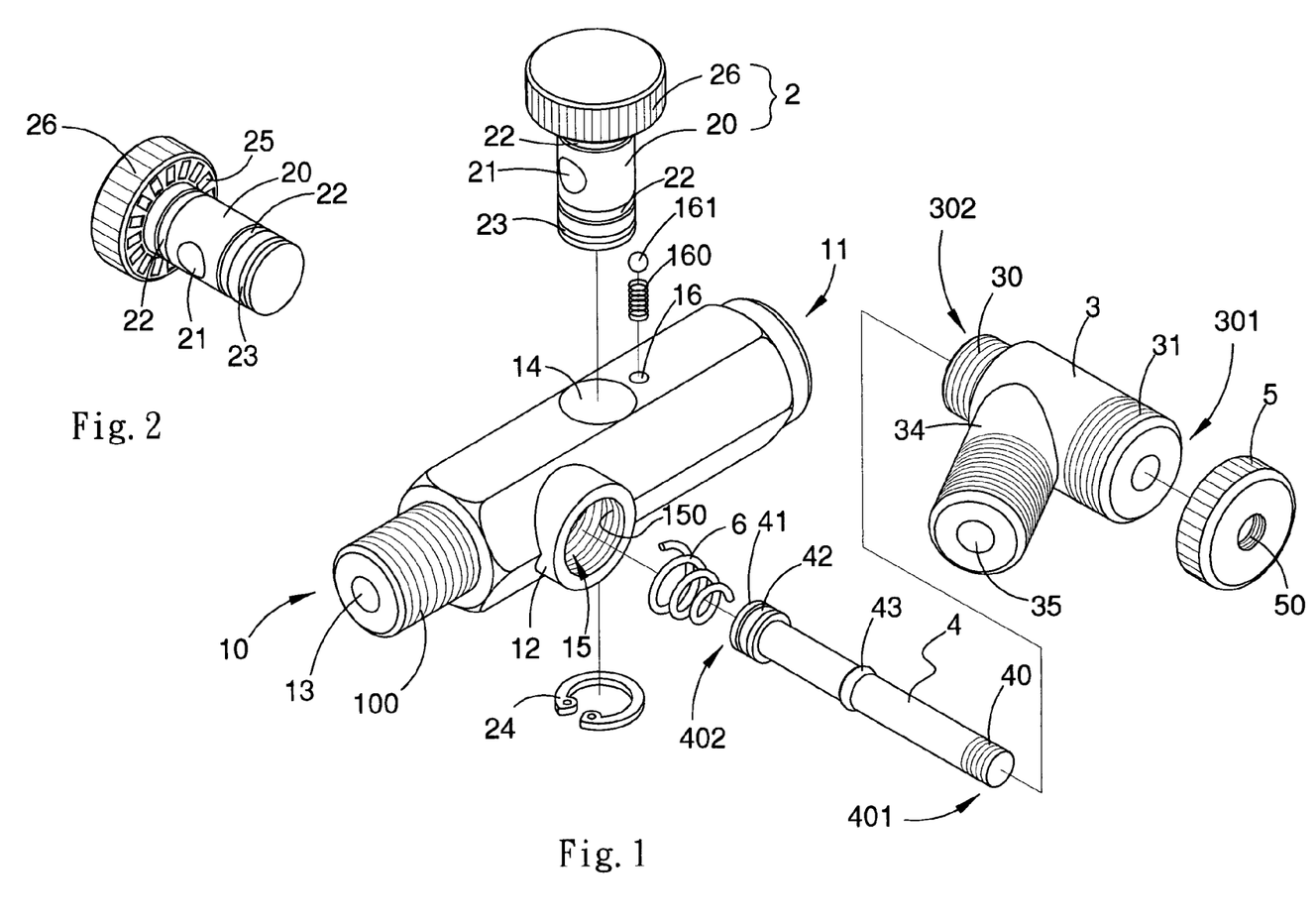
FIG. 1 is an exploded view of an embodiment of present invention.
FIG. 2 is a perspective view of the revolving valve of the embodiment.
Figure 3:
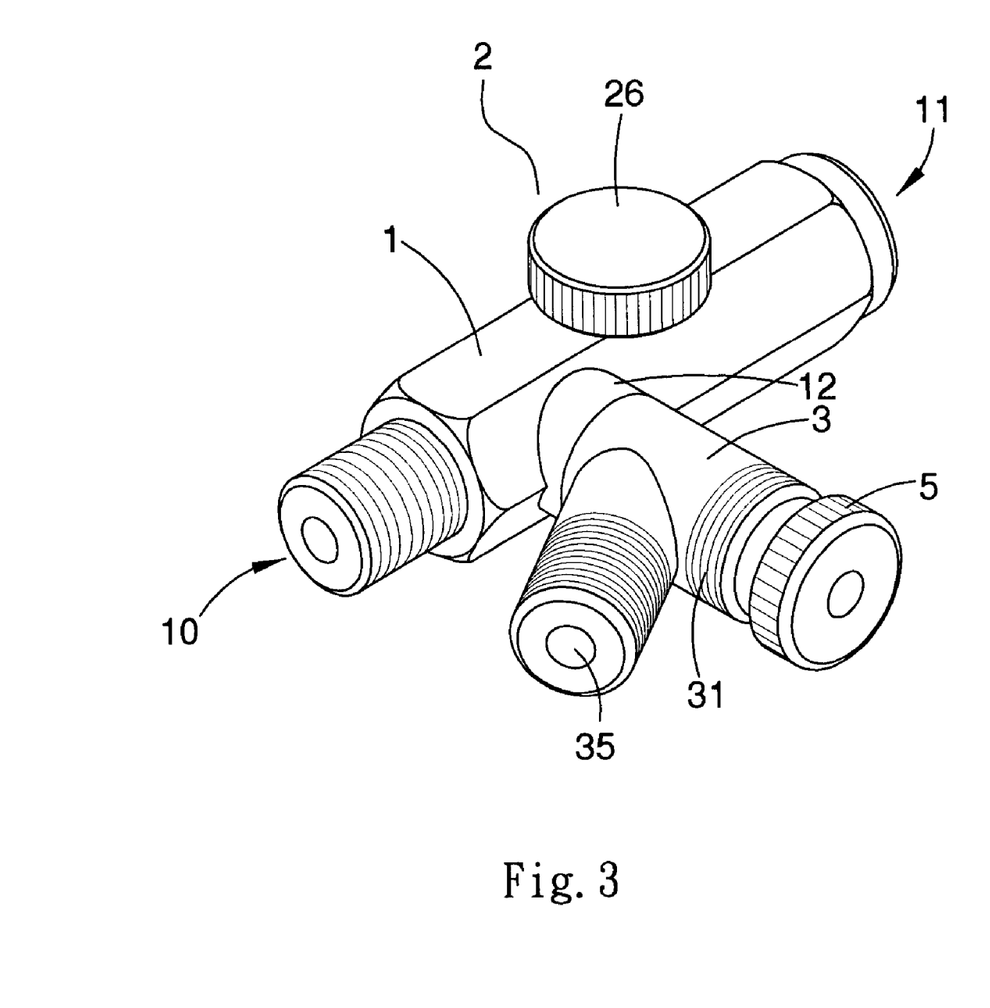
FIG. 3 is a perspective view of the embodiment.
Figure 4:
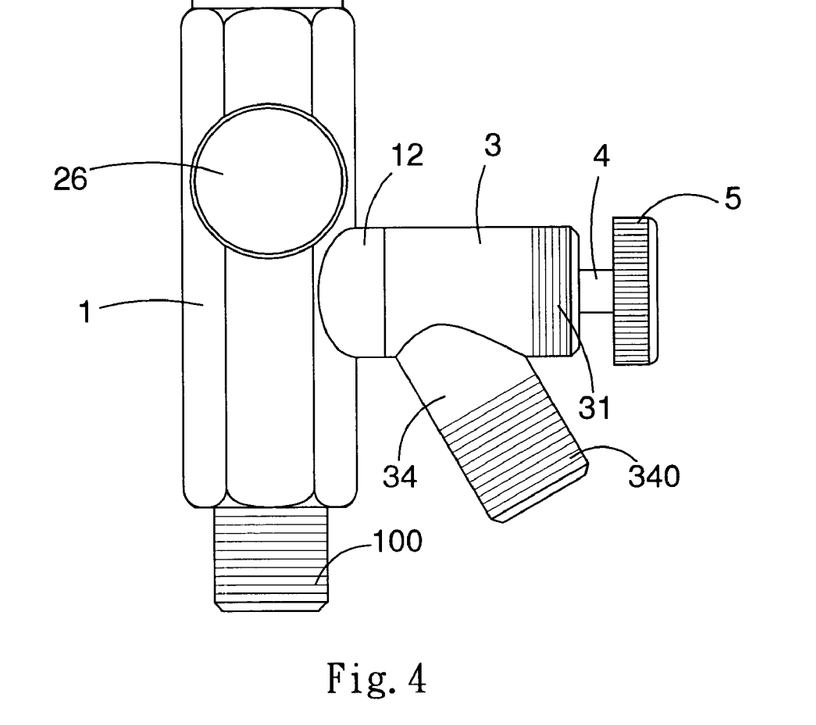
FIG. 4 is a top view of the embodiment.
Figure 5:
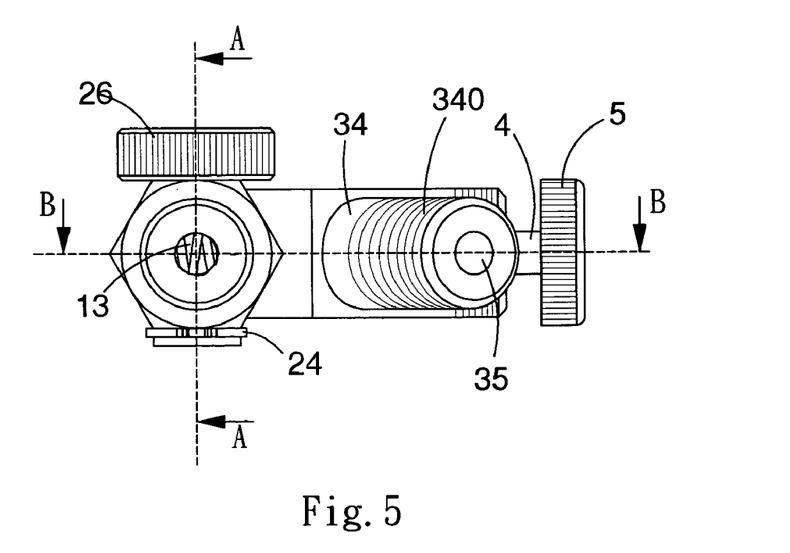
FIG. 5 is a front view of the embodiment

The protrusion 12 has a receptacle 15 therein communicated with the main channel 13. The revolving valve 2 is rotably received through the tunnel 14. The revolving valve 2 contains a valve cap 26 and a valve rod 20 mounted to the valve cap 26. The controlling channel 21 is communicable to the main channel 13. The revolving valve 2 has a controlling channel 21 vertically therethrough. The valve cap 26 having multiple slots 25 radically installed thereunder for engaging with the positioning ball 161. The revolving valve 2 contains two O-ring 22 surrounding the valve rod 20 above and below the controlling channel 21 thereof respectively for preventing airflow leakage. A C-type coupler 24 is coupled to a ring slot 23 at an opposite end of the valve cap 26. The opposite end of the valve cap 26 is located outside of the elongated body 1.

The stem 3 is connected to the receptacle 15. The stem 3 has a stem channel 32 therein, communicable with the main channel 13. The stem 3 contains a recession 320 at a second end 302 thereof. The recession 320 has a larger diameter than a diameter of the stem channel 32 at the second end 302 of the stem 3. The second end 302 of the stem 3 has a threaded out periphery 30 to be engaged with a threaded portion 150 in the receptacle 15.

The piston valve rod 4 has a block 41 mounted to a second end 402 thereof. The block 41 of the piston valve rod 4 is engaged with the recession 320 of the stem 3 for restricting movements of the piston valve rod 4. Thereby the piston valve rod 4 won't slide fully off the stem channel 32. The block 41 of the piston valve rod 4 has an O-ring 42 surrounding thereof for sealing the recession 320 of the stem 3. The piston valve rod 4 has an O-ring 43 surrounding thereof for sealing the stem channel 32.

The branch 34 is connected to the stem 3. The branch 34 has a threaded portion 340 for engaging with a tube and a branch channel 35 therein communicated with the stem channel 32 of the stem 3. The piston valve rod 4 is slidably received in the stem channel 32 of the stem 3 with a first end 401 extended out thereof. The button 5 is mounted with the first end 401 of the piston valve rod 4. The button 5 contains an inwardly threaded flange 51. The inwardly threaded flange 51 has a threaded portion 52 to be threadly engaged with an outwardly threaded periphery 31 of a first end 301 of the stem 3. The button 5 has a thread hole 50 therethrough to be engaged with a threaded portion 40 of the first end 401 of the piston valve rod 4.

The spring 6 is placed with one end against a bottom 151 of the receptacle 15 of the protrusion 12 and with another end against the second end 402 of the piston valve rod 4. The piston valve rod 4 can be pressed against the spring 6 to let the main channel 13 to communicate with the branch channel 35 through the stem channel 32 and the piston valve rod 4 can be released to block communication between the main channel 13 and the branch channel 35.

Figure 6:
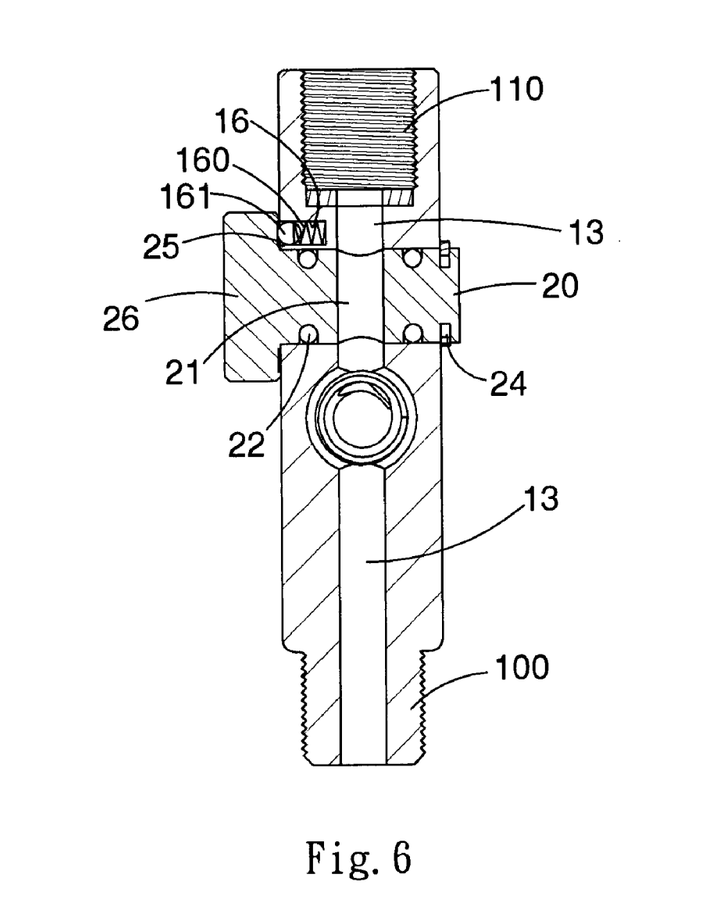
FIG. 6 is a cross sectional view of the cross section A—A of FIG. 5 showing the revolving valve is rotated to a position that the controlling channel of the revolving valve is communicated with the main channel.
Figure 7:
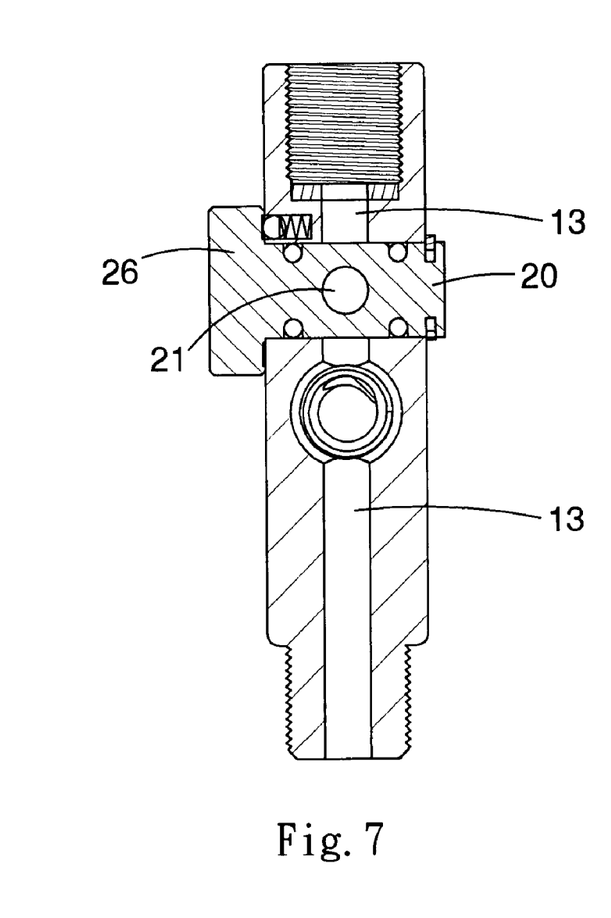
FIG. 7 a cross sectional view of the cross section A—A of FIG. 5 showing the revolving valve is rotated to a position that the controlling channel of the revolving valve is not communicated with the main channel.

With reference to FIG. 6, the revolving valve 2 is rotated to a position that the controlling channel 21 of the revolving valve 2 is communicated with the main channel 13. With reference to FIG. 7, the revolving valve 2 is rotated to a position to block communication between the controlling channel 21 and the main channel 13. Accordingly, rotating the revolving valve 2 to a desired position can control air volume passing through the main channel 13.

Figure 8:
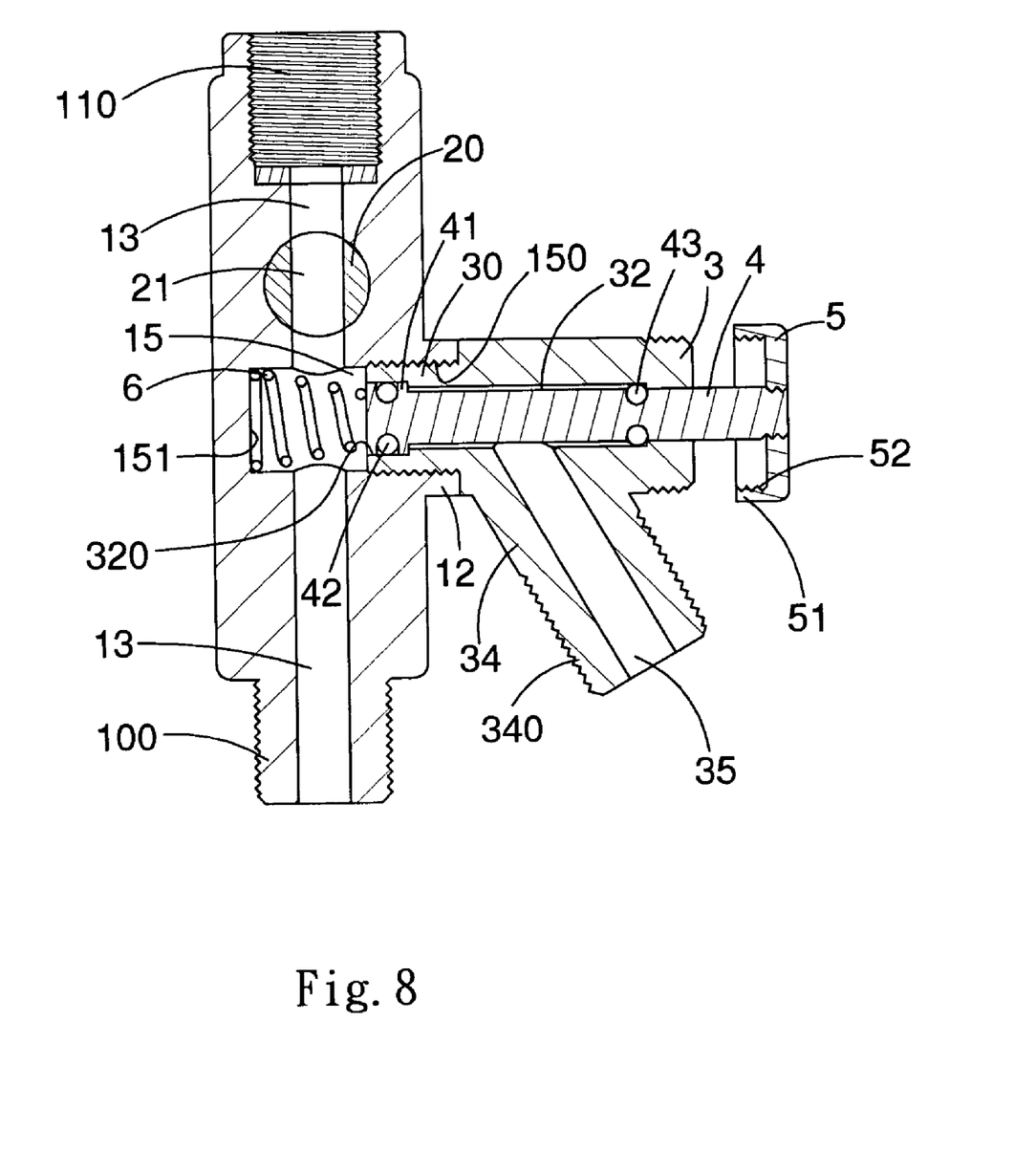
FIG. 8 is a cross sectional view of the cross section B—B of FIG. 5.
Figure 9:
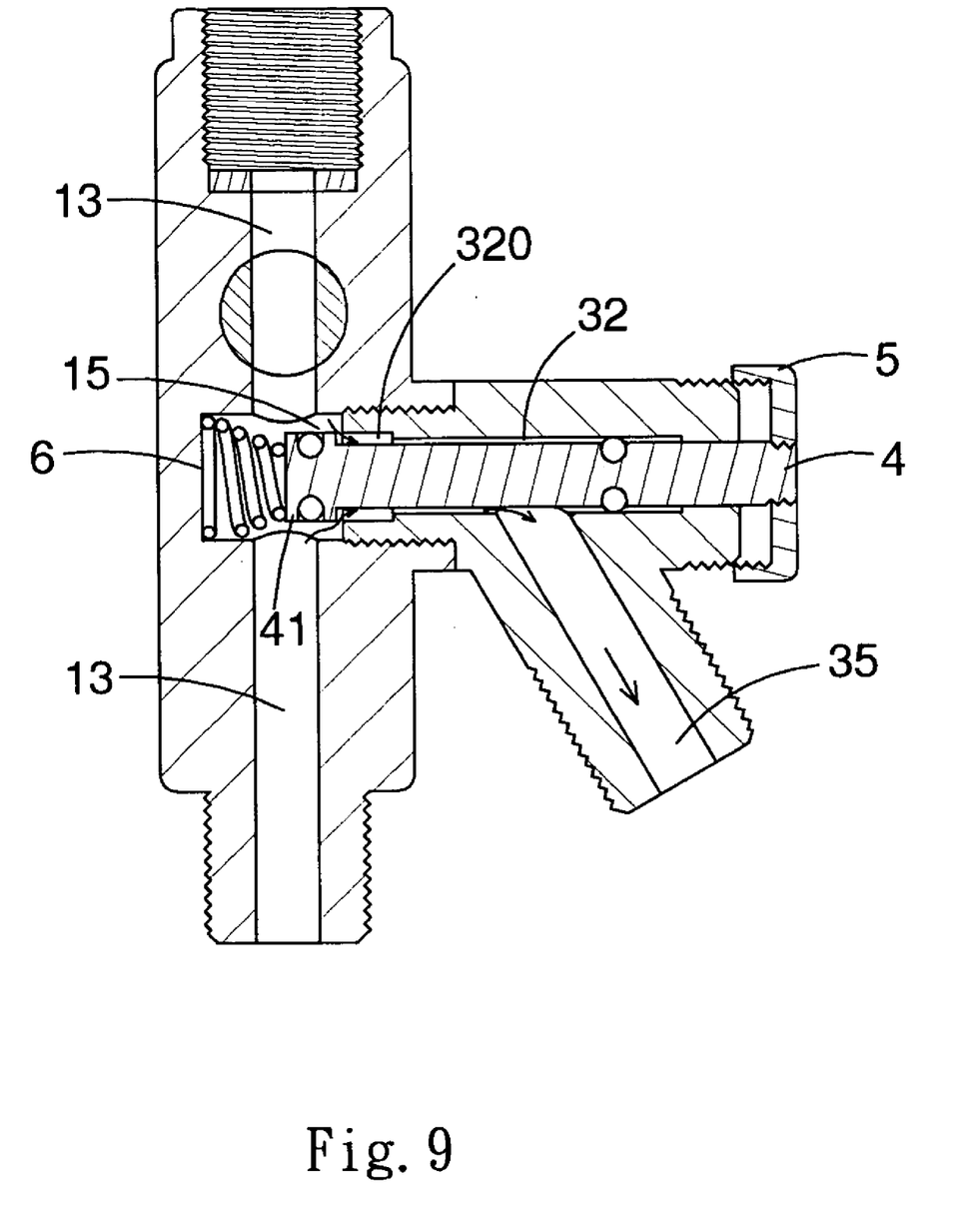
FIG. 9 is a cross sectional view of the embodiment showing the piston valve rod be pressed a little against the spring to let the main channel to communicate with the branch channel through the stem channel.
Figure 10:
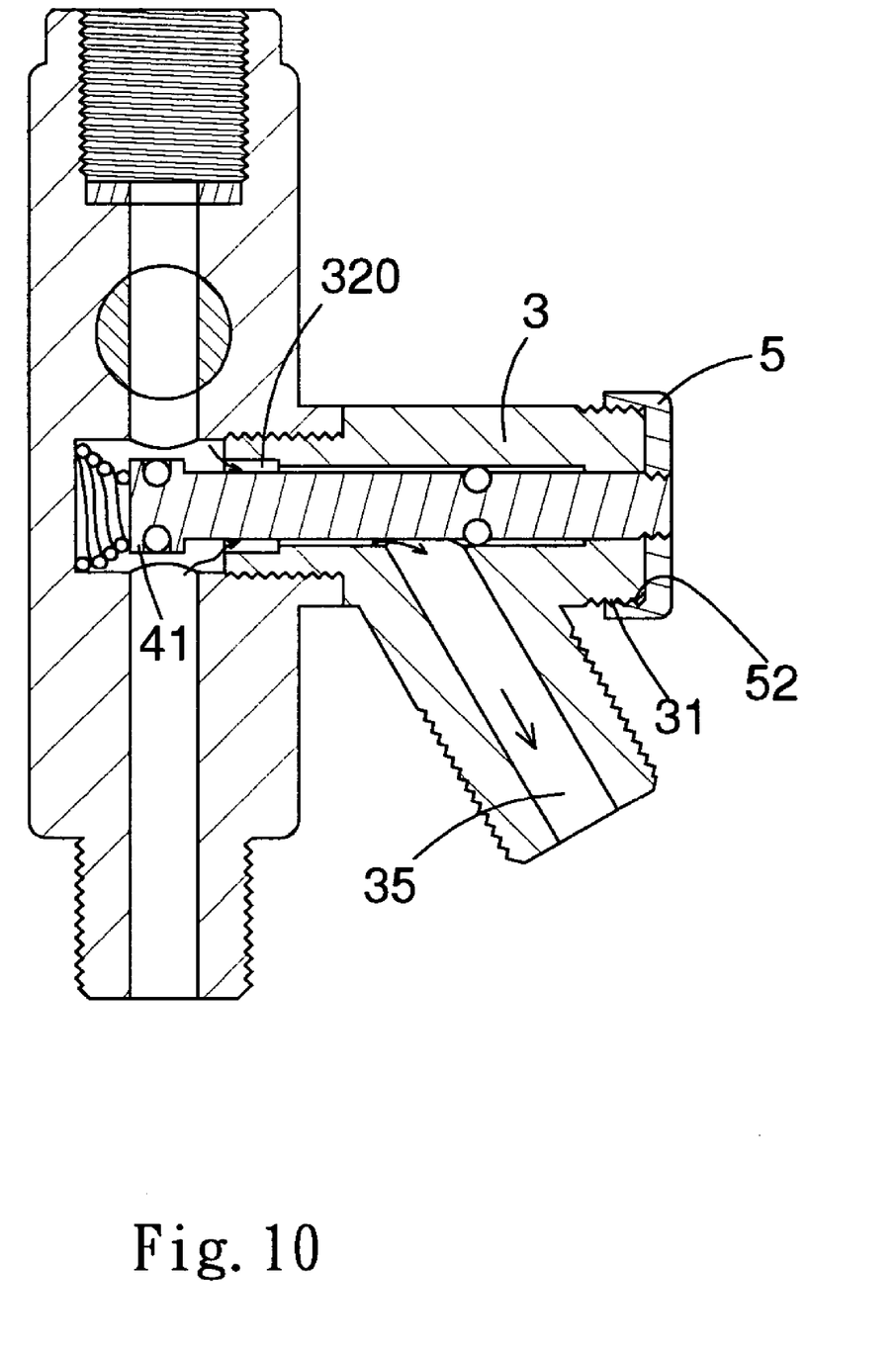
FIG. 10 is a cross sectional view of the embodiment showing the piston valve rod be fully pressed against the spring to let the main channel to communicate with the branch channel through the stem channel.

Referring to FIG. 8, when the button 5 is not pressed, the block 41 of the piston valve rod 4 is engaged with the recession 320 to block the communication from the main channel 13 to the branch channel 35. In this practice, the multifunction tube joint can be used as an air sprayer. Referring to FIG. 9 and FIG. 10, the button 5 is pressed against the spring 6 and the block 41 leaves the recession 320. In this practice, part of the air flow in the main channel 13 can flow from the main channel 13 through the receptacle 15, part of the stem channel 32, and come out of the branch channel 35. With reference to FIG. 10, when the button 5 is fully pushed and the threaded portion 52 of the button is engaged with the outwardly threaded periphery 31 of a first end 301 of the stem 3, the multifunction tube joint of the embodiment is used as a T-tube.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extend indicated by the broad general meaning of the terms in which the appended claims are expressed.

We claim:

1. A multifunction tube joint comprising:
    an elongated body comprising:
        a main channel longitudinally therethrough;
        a protrusion thereon, said protrusion having a receptacle therein communicated with said main channel; and
        a tunnel vertically therethrough;
    a revolving valve rotably received through said tunnel, said revolving valve having a controlling channel vertically therethrough, said controlling channel is communicable to said main channel;
    a stem connected to said receptacle, said stem having a stem channel therein, communicable with said main channel;
    a branch connected to said stem, said branch having a branch channel therein communicated with said stem channel of said stem;
    a piston valve rod slidably received in said stem channel of said stem with a first end extended out thereof;
    a button mounted with said first end of said piston valve rod, said button being engagable with said stem; and
    a spring placed with one end against a bottom of said receptacle of said protrusion and with another end against an second end of said piston valve rod;
    wherein said piston valve rod is pressed against said spring to let said main channel to communicate with said branch channel through said stem channel, said piston valve rod being released to block communication between said main channel and said branch channel.

2. The multifunction tube joint as claimed in claim 1 wherein said elongated body further comprising a concave next to said tunnel.

3. The multifunction tube joint as claimed in claim 2 further comprising a compression spring received in said concave and a positioning ball placed on top of said compression spring, said positioning ball being engaged with said revolving valve for controlling rotation thereof.

4. The multifunction tube joint as claimed in claim 3 wherein said revolving valve comprising a valve cap and a valve rod mounted to said valve cap, said controlling channel being installed vertically through said valve rod, said valve cap having multiple slots radically installed thereunder for engaging with said positioning ball.

5. The multifunction tube joint as claimed in claim 4 wherein said button comprises an inwardly threaded flange for threadly engaged with an outwardly threaded periphery of a first end of said stem.

6. The multifunction tube joint as claimed in claim 5 wherein said revolving valve comprises two O-ring surrounding said valve rod above and below said controlling channel thereof respectively.

7. The multifunction tube joint as claimed in claim 6 further comprising a C-type coupler coupled to an opposite end of said valve cap, outside of said elongated body.

8. The multifunction tube joint as claimed in claim 7 wherein said stem comprises a recession at a second end thereof, said recession having a larger diameter than a diameter of said stem channel.

9. The multifunction tube joint as claimed in claim 8 wherein said piston valve rod having a block mounted to said second end thereof, said block of said piston valve rod being engaged with said recession of said stem for restricting movements of said piston valve rod.

10. The multifunction tube joint as claimed in claim 9 wherein said block of said piston valve rod has an O-ring surrounding thereof for sealing said recession of said stem.

11. The multifunction tube joint as claimed in claim 10 wherein said piston valve rod has an O-ring surrounding thereof for sealing said stem channel.

12. The multifunction tube joint as claimed in claim 11 wherein said button is treadedly engaged with said first end of said stem.

13. The multifunction tube joint as claimed in claim 12 wherein said second end of said stem is threadly engaged with said receptacle of said protrusion.

14. The multifunction tube joint as claimed in claim 13 wherein said elongated body having an outwardly thread periphery at a first end thereof.

15. The multifunction tube joint as claimed in claim 14 wherein said elongated body having an inwardly thread periphery at a second end thereof.

* * * * *